(12) United States Patent
Matsui et al.

(10) Patent No.: US 12,513,393 B2
(45) Date of Patent: Dec. 30, 2025

(54) FOCUS CONTROL APPARATUS, IMAGE PICKUP APPARATUS, AND FOCUS CONTROL METHOD

(71) Applicant: CANON KABUSHIKI KAISHA, Tokyo (JP)

(72) Inventors: Yohei Matsui, Kanagawa (JP); Hideki Ogura, Kanagawa (JP); Hiroshi Yashima, Kanagawa (JP); Kuniaki Sugitani, Kanagawa (JP); Akihiko Kanda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 294 days.

(21) Appl. No.: 18/466,329

(22) Filed: Sep. 13, 2023

(65) Prior Publication Data

US 2024/0098366 A1    Mar. 21, 2024

(30) Foreign Application Priority Data

Sep. 15, 2022 (JP) ................. 2022-147457

(51) Int. Cl.
*H04N 23/67* (2023.01)
*G06T 7/20* (2017.01)
*H04N 23/611* (2023.01)

(52) U.S. Cl.
CPC ............ *H04N 23/67* (2023.01); *G06T 7/20* (2013.01); *H04N 23/611* (2023.01)

(58) Field of Classification Search
CPC .... H04N 23/67; H04N 23/611; H04N 23/617; H04N 23/663; H04N 23/675;
(Continued)

(56) References Cited

U.S. PATENT DOCUMENTS

| 7,978,879 B2* | 7/2011 | Muramatsu | ............ H04N 23/61 348/135 |
| 11,653,091 B2* | 5/2023 | Ishii | ..................... H04N 23/673 348/345 |

(Continued)

FOREIGN PATENT DOCUMENTS

| JP | 2001-021794 A | 1/2001 |
| JP | 2019-020716 A | 2/2019 |

OTHER PUBLICATIONS

Liu et al.; "SSD: Single Shot Multibox Detector.;" UNC Chapel Hill ; Zoox Inc.; Google Inc.; University of Michigan, Ann-Arbor; In: ECCV2016; Dec. 29, 2016; pp. 1-17.

(Continued)

*Primary Examiner* — Lin Ye
*Assistant Examiner* — Tuan H Le
(74) *Attorney, Agent, or Firm* — Canon U.S.A., Inc. IP Division

(57) ABSTRACT

An apparatus configured to perform focus tracking on an object within a detection area to detect a defocus amount within an imaging angle of view includes a memory storing instructions, and a processor configured to execute the instructions to perform focus tracking determination to determine whether or not the focus tracking is to be performed using information about the defocus amount, and acquire information about a shield against the object from image data generated by imaging. The processor is configured to perform the focus tracking determination using information about the shield acquired in the detection area.

20 Claims, 16 Drawing Sheets

(58) Field of Classification Search
CPC .... H04N 23/62; H04N 23/635; H04N 23/673; H04N 23/743; H04N 23/631; G06T 7/20; G03B 13/36
See application file for complete search history.

(56) References Cited

U.S. PATENT DOCUMENTS

| | | | |
|---|---|---|---|
| 12,141,999 B2* | 11/2024 | Inagaki | G06T 7/70 |
| 2013/0188086 A1* | 7/2013 | Fujiki | G03B 13/02 |
| | | | 348/333.09 |
| 2021/0337129 A1* | 10/2021 | Iwasaki | H04N 23/673 |
| 2022/0279132 A1* | 9/2022 | Watanabe | H04N 23/611 |
| 2022/0400207 A1* | 12/2022 | Funatsu | H04N 23/62 |

OTHER PUBLICATIONS

Chen et.al.; "DeepLab: Semantic Image Segmentation with Deep Convolutional Nets, Atrous Convolution, and Fully Connected CRFs"; arXiv, 2016; May 12, 2027; pp. 1-14.

* cited by examiner

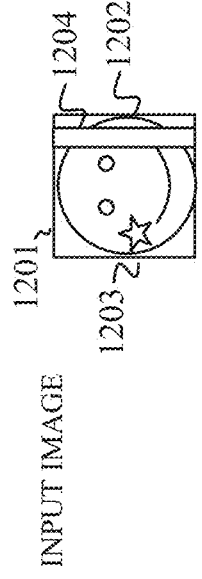
FIG. 2A
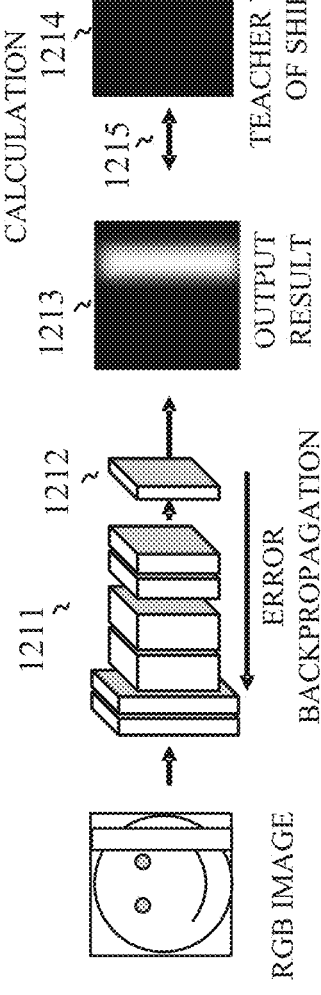
FIG. 2B
FIG. 2C

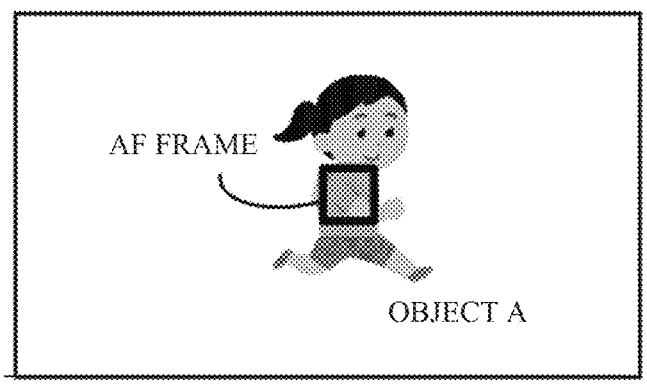
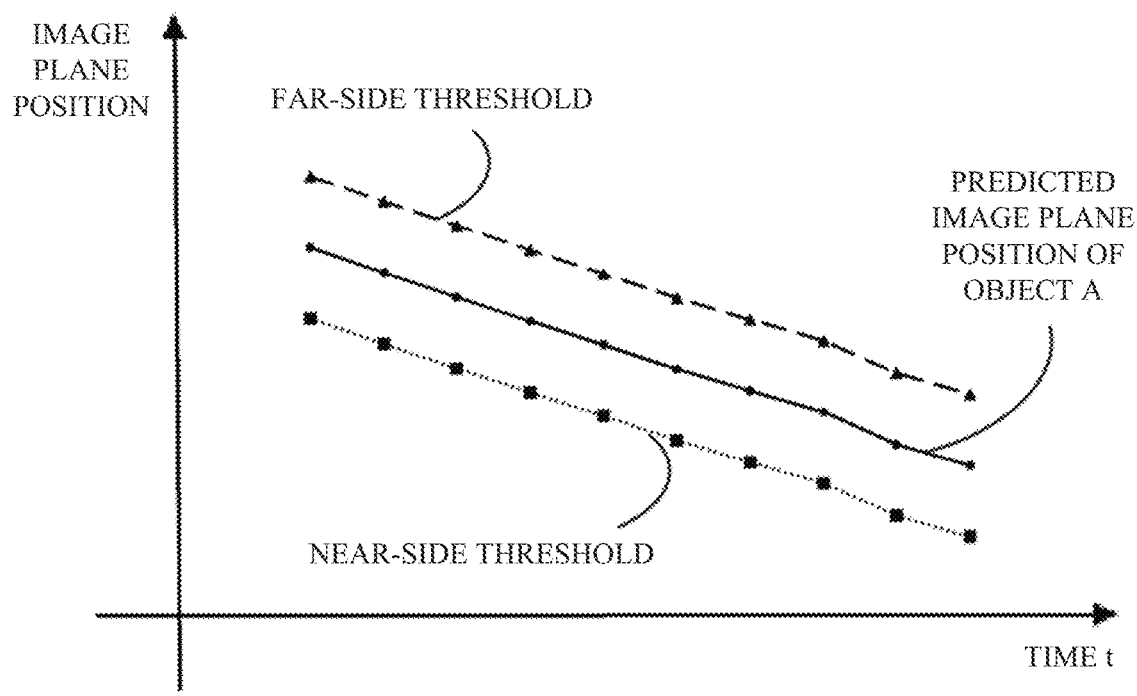
FIG. 5

FOCUS CONTROL APPARATUS, IMAGE PICKUP APPARATUS, AND FOCUS CONTROL METHOD

BACKGROUND

Technical Field

One of the aspects of the embodiments relates to a focus detecting technology for an image pickup apparatus, such as a digital camera.

Description of Related Art

Focus control on an object for the imaging optical system based on a detection result of a defocus amount of the imaging optical system has a servo mode suitable for focusing on a moving object. As disclosed in Japanese Patent Laid-Open No. 2001-021794, the servo mode calculates a function corresponding to changes in an image plane position at a plurality of times in the past, performs moving object prediction for finding a predicted image plane position at the next time from the function, and performs focus tracking on the moving object.

Japanese Patent Laid-Open No. 2019-020716 discloses focus control for setting a permissible defocus amount for a predicted image plane position and for determining whether or not to perform focus tracking (making focus tracking determination) based on a detected defocus amount by determining whether the detected defocus amount is equal to or smaller than the permissible defocus amount.

The focus tracking determination is made to prevent inadvertent focus movement even in a case where an obstacle passes in front of a main object that a camera user is framing as an imaging target, or in a case where the user fails to frame the main object. However, the focus tracking determination may be against the intention of the user. For example, in a case where the detected defocus amount for the obstacle that has passed near and in front of the main object is equal to or less than the permissible defocus amount, focus tracking is performed on the obstacle. In a case where the user intentionally frames another main object with a large defocus difference, focus tracking is not performed on the new main object. Thus, it may be difficult to perform correct focus tracking determination based only on the detected defocus amount.

SUMMARY

An apparatus according to one aspect of the embodiment is configured to perform focus tracking on an object within a detection area to detect a defocus amount within an imaging angle of view. The focus control method includes a memory storing instructions, and a processor configured to execute the instructions to perform focus tracking determination to determine whether or not the focus tracking is to be performed using information about the defocus amount, and acquire information about a shield against the object from image data generated by imaging. The processor is configured to perform the focus tracking determination using information about the shield acquired in the detection area. An optical apparatus and an image pickup apparatus each having the above focus control apparatus, and a focus control method corresponding to the above focus control apparatus also constitute another aspect of the disclosure.

Further features of the disclosure will become apparent from the following description of embodiments with reference to the attached drawings.

BRIEF DESCRIPTION OF THE DRAWINGS

FIGS. 2A, 2B, and 2C explain shield information in the first embodiment.

FIG. 5 illustrates changes in an object image plane position in the first embodiment.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

First Embodiment

Figure 1:
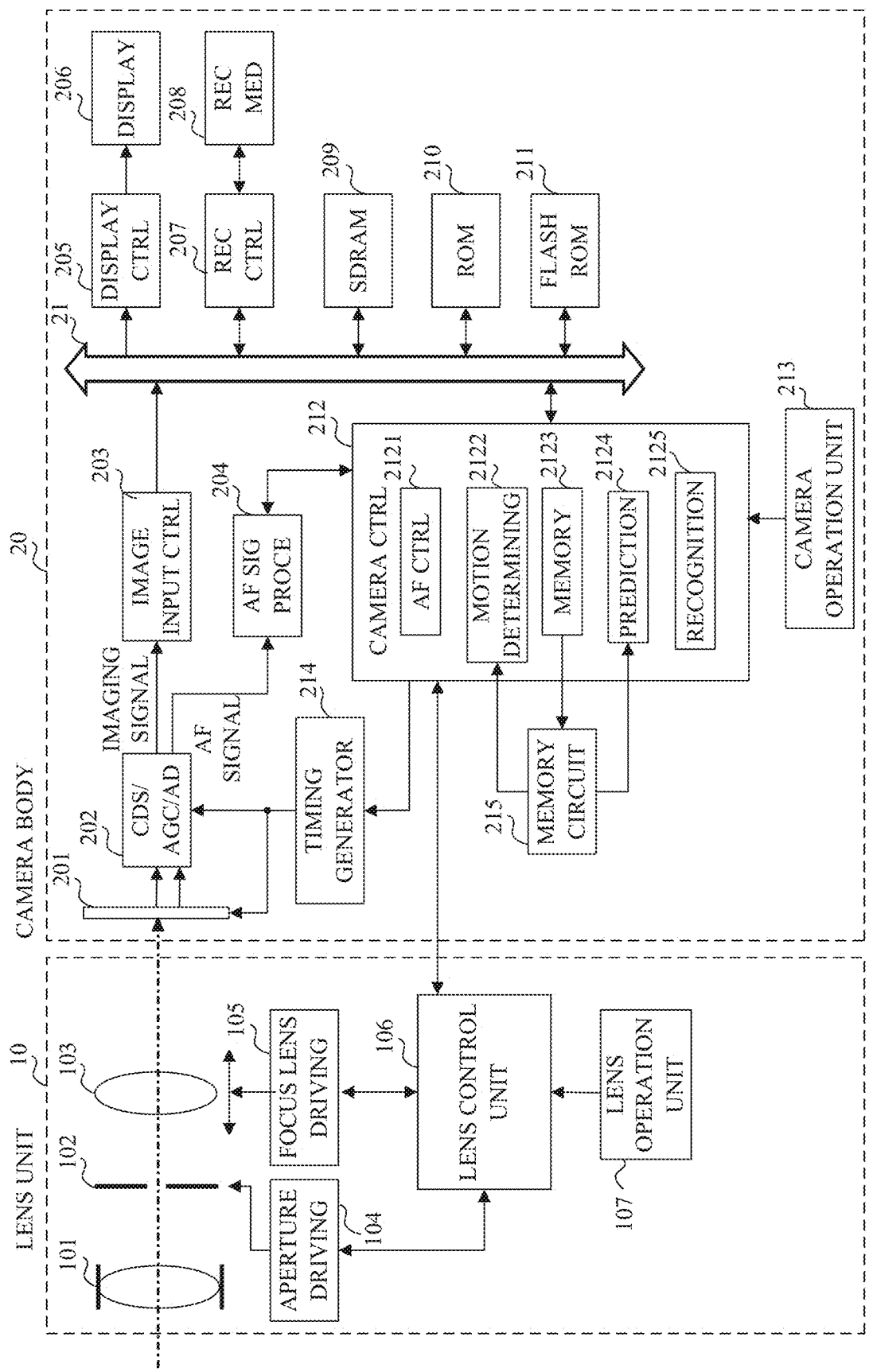
FIG. 1 is a block diagram illustrating a configuration of a lens interchangeable type camera system according to a first embodiment.

FIG. 1 illustrates the configuration of a lens interchangeable type camera system according to a first embodiment. The camera system includes a camera body 20 as an image pickup apparatus (optical apparatus) and a lens unit 10 that is attachable to and detachable from the camera body 20. A lens control unit 106 provided in the lens unit 10 and a camera control unit 212 provided in the camera body 20 can communicate with each other through a communication terminal provided on an unillustrated mount provided in the camera body 20.

The lens unit 10 includes an imaging optical system that includes, in order from the object side to the image side, an imaging optical system including a fixed lens 101, an aperture stop (diaphragm) 102, and a focus lens 103. The aperture stop 102 is driven by an aperture driving unit 104 to control a light amount incident on an image sensor 201, which will be described below. The focus lens 103 is driven by a focus lens driving unit 105 during focusing. The aperture driving unit 104 and the focus lens driving unit 105 are controlled by the lens control unit 106 that receives a control signal from the camera control unit 212 to change the aperture diameter of the aperture stop 102 and the position of the focus lens 103.

A lens operation unit 107 is an input device operable by the user to perform various settings such as switching between autofocus (AF) and manual focus (MF), adjusting the position of the focus lens during MF, setting the operating range of the focus lens, and setting an image stabilization mode.

The lens operation unit 107 is operated by a user, and transmits an operation signal according to the operation of the user to the lens control unit 106. The lens control unit 106 controls the aperture driving unit 104 and the focus lens driving unit 105 according to a control instruction and control information received from the camera control unit 212. The lens control unit 106 transmits lens control information to the camera control unit 212 in response to a request from the camera control unit 212.

The camera body 20 includes the image sensor 201 configured to capture an object image (object within the imaging angle of view) formed by the imaging optical system of the lens unit 10. The image sensor 201 includes a photoelectric conversion element such as a CCD sensor or a CMOS sensor. A plurality of two-dimensional pixels are provided on the imaging surface of the image sensor 201, and each pixel accumulates an electric charge according to an incident light amount. The charges accumulated in the plurality of pixels are sequentially read out as a voltage signal at a timing of the driving pulse signal output from a timing generator 214 according to the command from the camera control unit 212.

Each pixel of the image sensor 201 includes two (a pair of) photodiodes A and B and a single microlens provided for the pair of photodiodes A and B. Each pixel divides incident light with the microlens to form a pair of optical images on a pair of photodiodes A and B, and a pair of phase difference image signals (A signal and B signal) for an AF signal (focus detecting signal) to be described below from the pair of photodiodes A and B is output. By adding the outputs of the pair of photodiodes A and B, an imaging signal (A+B signal) can be obtained.

By combining a plurality of A signals and a plurality of B signals output from a plurality of pixels, a pair of phase difference image signals as the AF signal are obtained that are used for AF by an imaging-plane phase-difference detecting method (referred to as imaging-plane phase-difference AF hereinafter) is obtained.

A CDS/AGC/AD converter 202 performs correlated double sampling, gain control, and AD conversion for removing reset noise on the AF signal and the imaging signal read from the image sensor 201. The CDS/AGC/AD converter 202 outputs the imaging signal that has undergone these processes to an image input controller 203 and the AF signal to an AF signal processing unit 204, respectively.

The image input controller 203 stores as an image signal the imaging signal output from the CDS/AGC/AD converter 202 in an SDRAM 209 via a bus 21. The image signal stored in the SDRAM 209 is read by a display control unit 205 via the bus 21 and displayed on a display unit 206. In a recording mode for recording the image signal, the image signal stored in the SDRAM 209 is recorded in a recording medium 208 such as a semiconductor memory by a recording medium control unit 207.

A ROM 210 stores a program for the camera control unit 212 to execute various processing and various data necessary for the processing. A flash ROM 211 stores various setting information on the operation of the camera body 20 set by the user.

An AF signal processing unit (detector) 204 performs a correlation operation for a pair of phase difference image signals, which are AF signals output from the CDS/AGC/AD converter 202, and calculates a phase difference, which is a shift amount between the pair of phase difference image signals (referred to as an image shift amount hereinafter). The AF signal processing unit 204 calculates the defocus amount (and defocus direction) of the imaging optical system from an image shift amount. The AF signal processing unit 204 also calculates the reliability of the pair of phase difference image signals. The reliability is calculated using the degree of two-image matching and the steepness of a correlation change amount. The AF signal processing unit 204 sets a position and size of an AF frame, which is a detection area in which AF including focus detection is performed within an imaging screen (imaging angle of view). The AF signal processing unit 204 outputs information about the defocus amount and reliability calculated within the AF frame to the camera control unit 212.

An AF control unit (control unit) 2121 in the camera control unit 212 instructs the lens control unit 106 to move the focus lens 103 based on the defocus amount from the AF signal processing unit 204. A motion determining unit (moving object determining unit) 2122 in the camera control unit 212 calculates an image plane position (position where an object image is formed) from the defocus amounts at a plurality of times stored in a memory circuit 215 by a memory 2123 to determine motion. Then, the AF control unit 2121 causes a prediction unit 2124 to predict a future image plane position, calculates a driving amount of the focus lens 103 necessary to coincide the predicted image plane position with the imaging plane, and instructs the lens control unit 106 to drive the lens 103 with this driving amount. Thereby, focus tracking is performed in which the focal position (focus plane) follows the image plane position of the object captured within the AF frame.

The AF control unit (determining unit) 2121 sets an image plane position range in a permissible defocus state (predetermined range: referred to as a focus tracking range hereinafter) based on the prediction result of the prediction unit 2124. Then, the AF control unit 2121 determines whether or not focus tracking is to be performed (referred to as focus tracking determination hereinafter) by determining whether or not an image plane position corresponding to a detected defocus amount (referred to as a detected defocus amount hereinafter) is within a focus tracking range.

An object recognition unit (acquiring unit) 2125 detects an object based on image data obtained by imaging with the image sensor 201. In this embodiment, the object detection estimates a position of a target object (main object) in the image data, and estimates a shield area as an area of a shield (obstacle and another object) that exists in front of the main object and shields the main object. Then, the object recognition unit 2125 generates information about the shield (referred to as shield information hereinafter) from the estimation result of the shield area. The shield information is information indicating the presence of the shield area, the position and size of the shield area, and whether the shield area is a specific object such as a person.

The main object position and the shield area are estimated by a Convolutional Neural Network (CNN).

The CNN generally has multistage calculations. Each stage of the CNN performs a convolution calculation, spatially integrates a local feature of the image data, and inputs the result to intermediate layer neurons of the next stage. An operation called pooling or subsampling is performed to compress a feature amount in a spatial direction. The CNN can obtain complex feature representations through such multistage feature transformation. Therefore, object category recognition, object detection, and area segmentation, which will be described below, can be performed with high accuracy based on the same feature amount.

Machine learning of the CNN may be performed by arbitrary methods. A computer such as a server may perform the CNN machine learning, and the camera body 20 may acquire the learned CNN from the computer. At this time, the computer inputs image data for learning and performs machine learning of the CNN by performing teacher learning using the position of the object corresponding to the image data for learning as teacher data. The AF control unit 2121 changes the determination result of the focus tracking determination based on the information on the shield area obtained by the CNN.

The object recognition unit 2125 allows the user to set as an object transition characteristic, through the camera operation unit 213, a function as to whether the main object is to be actively switched to a newly detected object or the main object is not to be switched at all in detecting a plurality of different objects.

The AF signal processing unit 204 and the camera control unit 212 constitute a focus control apparatus. Although the focus control apparatus is mounted on the camera body 20 in this embodiment, the focus control apparatus may be mounted on the lens unit (optical apparatus) 10.

A description will now be given of the estimation of the main object position and the shield area by the object recognition unit 2125 in more detail. The estimation of the position of the main object detects a specific object (here, a face of a person) from the image data. A technology for detecting a specific object from image data is described in Liu, SSD: Single Shot Multibox Detector. In: ECCV2016. This embodiment detects a face of a person as a specific object, but various objects such as a whole body of a person, an animal, a vehicle, etc. can be specified as a specific object. The estimation of the shield area segments the area of the detected specific object. A technology for area segmentation is described in Chen et. al, DeepLab: Semantic Image Segmentation with Deep Convolutional Nets, Atrous Convolution, and Fully Connected CRFs, arXiv, 2016.

The CNN based on machine learning that has learned the shield area for the object area as a positive example and the other as a negative example infers the area segmentation, and outputs the likelihood indicating the shield likelihood for each divided area. FIG. 2A illustrates input image data (input image) for segmentation. An area 1201 is an area in which a face of a person as a specific object is detected by object detection, and a face area 1202 is a face area to be detected by object detection. A shield area 1203 with no depth difference and a shield area 1204 with a depth difference are illustrated for a face area 1202. Various definitions are conceivable for the shield area, and an example thereof will be illustrated here.

FIG. 2B illustrates three definition examples of the shield area. White portions in FIG. 2B indicate shield areas and black portions indicate areas other than the shield areas. The first (the number one circle in FIG. 2B, and the same applies hereinafter) indicates a definition that sets areas different from the face area 1202 in the area 1201 to be positive and the other areas to be negative. The second illustrates a definition that sets the shield areas 1203 and 1204 by the shield at a front view area or in front of the face to be positive, and the other areas to be negative. The third illustrates a definition that sets the shield area 1204 that causes perspective conflict with the face to be positive, and the other areas to be negative.

In other words, the first definition divides a face of a person and the rest. The face of the person has a characteristic appearance pattern and a small dispersion of a pattern, so highly accurate area segmentation can be easily realized. The definition of the shield area is not limited to the three definitions described above, and any definitions that express the shield area may be used.

FIG. 2C illustrates a learning method of shield areas. A neural network 1211 illustrated in Chen et. al, DeepLab: Semantic Image Segmentation with Deep Convolutional Nets, Atrous Convolution, and Fully Connected CRFs, arXiv, 2016 outputs a likelihood score map 1212 of an shield area for an input image. An example of the likelihood score map 1212 is illustrated as an output result 1213. In Chen et. al, DeepLab: Semantic Image Segmentation with Deep Convolutional Nets, Atrous Convolution, and Fully Connected CRFs, arXiv, 2016 uses a method of estimating a front view area of a specific category object. More specifically, the map as the output result 1213 is compared with a teacher value 1214, and a loss value 1215 is calculated by a known method such as cross entropy or squared error. Then, the weight parameter of the neural network 1211 is adjusted by error backpropagation or the like so that the loss value 1215 gradually decreases (details of this processing are described in Chen et. al, DeepLab: Semantic Image Segmentation with Deep Convolutional Nets, Atrous Convolution, and Fully Connected CRFs, arXiv, 2016). The input image and training value have enough amounts. Since it is costly to create a teacher value for an area of overlapping objects, learning data may be created using computer graphics (CG) or an image combining method that cuts out and superimposes object images.

While exchanging information with each unit in the camera body 20, the camera control unit 212 controls it. The camera control unit 212 performs user operations such as powering on and off, changing a variety of settings, imaging processing, AF processing, and playback processing of image data for recording according to input from the camera operation unit 213 based on a user operation. The camera control unit 212 also transmits a control command to the lens unit 10 (lens control unit 106) and information about the camera body 20 to the lens control unit 106, and acquires information about the lens unit 10 from the lens control unit 106. The camera control unit 212 includes a microcomputer and controls the entire camera system including the lens unit 10 by executing computer programs stored in the ROM 210. The camera control unit 212 controls driving of the focus lens 103 through the lens control unit 106 based on the defocus amount calculated by the AF signal processing unit 204 as described above.

Figure 3:
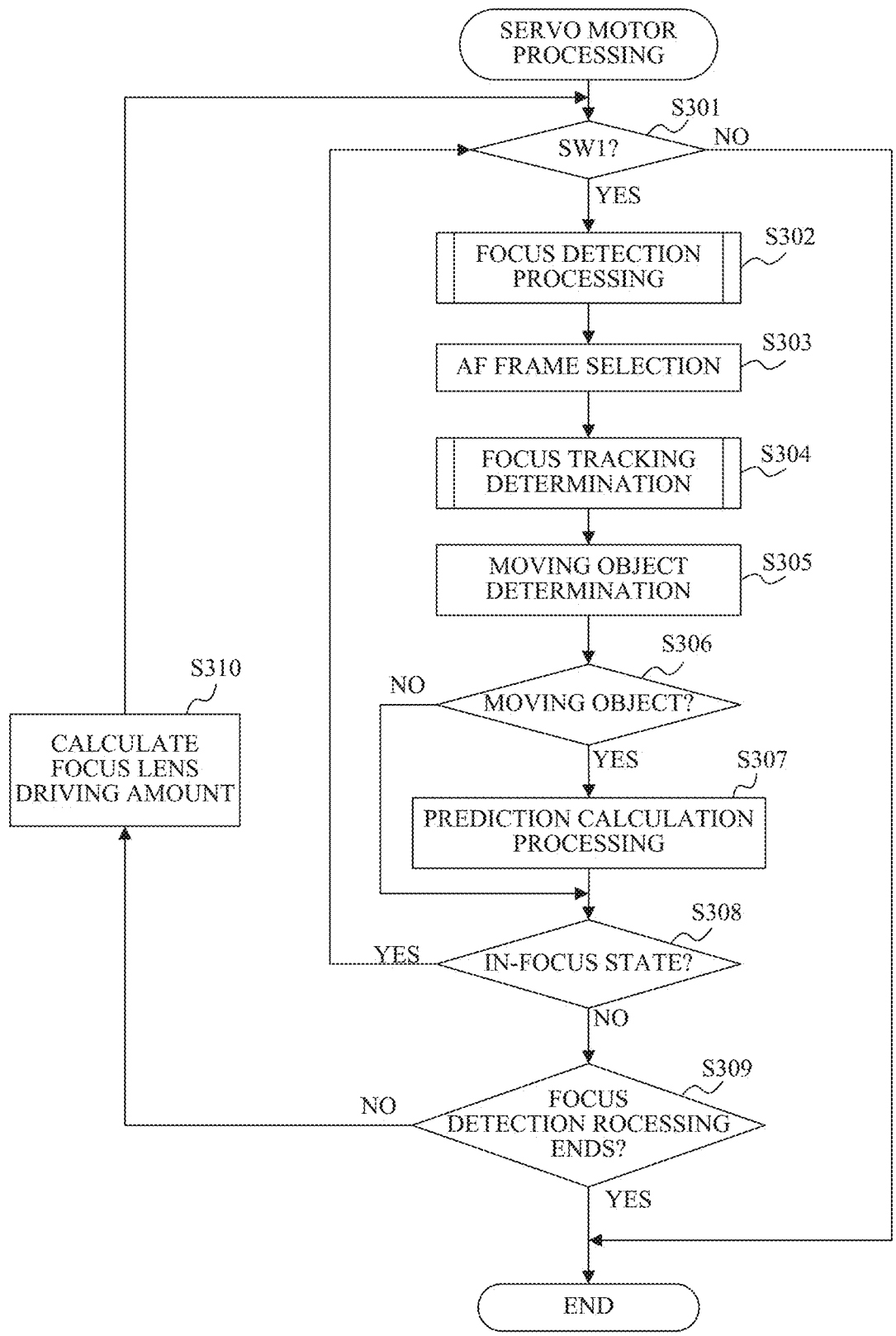
FIG. 3 is a flowchart illustrating servo mode processing according to the first embodiment.

A flowchart in FIG. 3 illustrates servo mode processing to be executed by the camera control unit 212 (AF control unit 2121, motion determining unit 2122, prediction unit 2124, and object recognition unit 2125) as a computer according to a computer program. S stands for the step.

The camera control unit 212 determines whether or not an imaging start switch SW1 provided in the camera operation unit 213 is turned on in S301. In a case where it is turned on, the flow proceeds to S302, and in a case where it is turned off, this flow ends.

In S302, the camera control unit 212 causes the AF signal processing unit 204 to perform focus detection processing. Details of the focus detection processing will be described below.

Next, in S303, the camera control unit 212 (AF control unit 2121) performs AF frame selection processing. This AF frame selection processing sets as a main AF frame one AF frame selected by the user through the camera operation unit 213 from among a plurality of AF frames within the imaging screen. However, in the AF frame selection processing, the camera control unit 212 may select as the main AF frame a predetermined AF frame at the screen center etc. from among the plurality of AF frames or an AF frame including coordinates at which a specific object is detected by the object recognition unit 2125.

Next, in S304, the camera control unit 212 (AF control unit 2121) performs focus tracking determination processing. Basically, the camera control unit 212 determines that focus tracking is to be performed in a case where the image plane position corresponding to the detected defocus amount obtained by the main AF frame is within the focus tracking range, and determines that focus tracking is not to be performed in a case where it is outside the focus tracking range. In a case where the camera control unit 212 determines that the focus tracking is not to be performed, the camera control unit 212 switches processing from that for focus tracking, such as not using the defocus amount relating to the determination for predictive calculation processing in S307, which will be described below, or not driving the focus lens 103 for S310. The details of focus tracking determination will be described below.

Next, in S305, the camera control unit 212 (motion determining unit 2122) performs moving object determination processing. More specifically, the camera control unit 212 determines whether the image plane position continuously changes by a predetermined amount or more, which is calculated from each of the detected defocus amounts obtained at a plurality of times including the current and past times in the main AF frame and stored in the memory circuit 215. In a case where the image plane position continuously changes by the predetermined amount or more, the object within the main AF frame is determined to be a moving object, and in a case where the image plane position does not change in that way, the object within the main AF frame is determined to be a non-moving object. The moving object determination processing may use another method.

In the next S306, the flow proceeds to S307 in a case where the result of the moving object determination processing in S305 is a moving object, and the flow proceeds to S308 in a case where it is a non-moving object.

In S307, the camera control unit 212 (prediction unit 2124) performs prediction calculation processing using the image plane position calculated from the detected defocus amount at multiple times stored in the memory circuit 215 by the memory 2123, and calculates a predicted image plane position (in other words, a predicted defocus amount). The predicted image plane position may be calculated using, as a prediction function, a quadratic curve that approximates coordinates of the image plane position and the time corresponding to each of the plurality of detected defocus amounts, or may be calculated using, as a prediction function, a linear curve passing through coordinates of the image plane position and time corresponding to each of the two latest detected defocus amounts. Alternatively, a prediction equation f(t) as illustrated in equation (1) may be obtained by statistical calculation using the least-squares method, and the predicted image plane position may be calculated using the prediction equation f(t):

$$f(t) = \alpha + \beta t + \gamma tn \qquad (1)$$

On the other hand, in S308, the camera control unit 212 (AF control unit 2121) determines whether or not the currently detected defocus amount is in an in-focus state within the in-focus range, and in a case where it is in the in-focus state, the flow proceeds to S301. In a case where it is not in the in-focus state, the flow proceeds to S309.

In S309, the camera control unit 212 (AF control unit 2121) determines whether or not the focus detection processing has ended. In a case where it is determined that the focus detection processing has ended, this flow ends, and in a case where it is determined that the focus detection processing has not yet ended, the flow proceeds to S310. It is determined that the focus detection processing has ended if the in-focus state is no longer available by further driving the focus lens 103, such as by moving (scanning) an entire drivable range of the focus lens 103.

In S310, the camera control unit 212 (AF control unit 2121) calculates a driving amount of the focus lens 103 necessary to coincide the predicted image plane position calculated in S307 with the imaging plane in a case where the object is determined to be a moving object in S305. In a case where the object is determined to be a non-moving object, a driving amount of the focus lens 103 is calculated from the detected defocus amount of the main AF frame detected in S302 and selected in S303. However, whether or not to drive the focus lens 103 is switched depending on the result of the focus tracking determination in S304.

Figure 4:
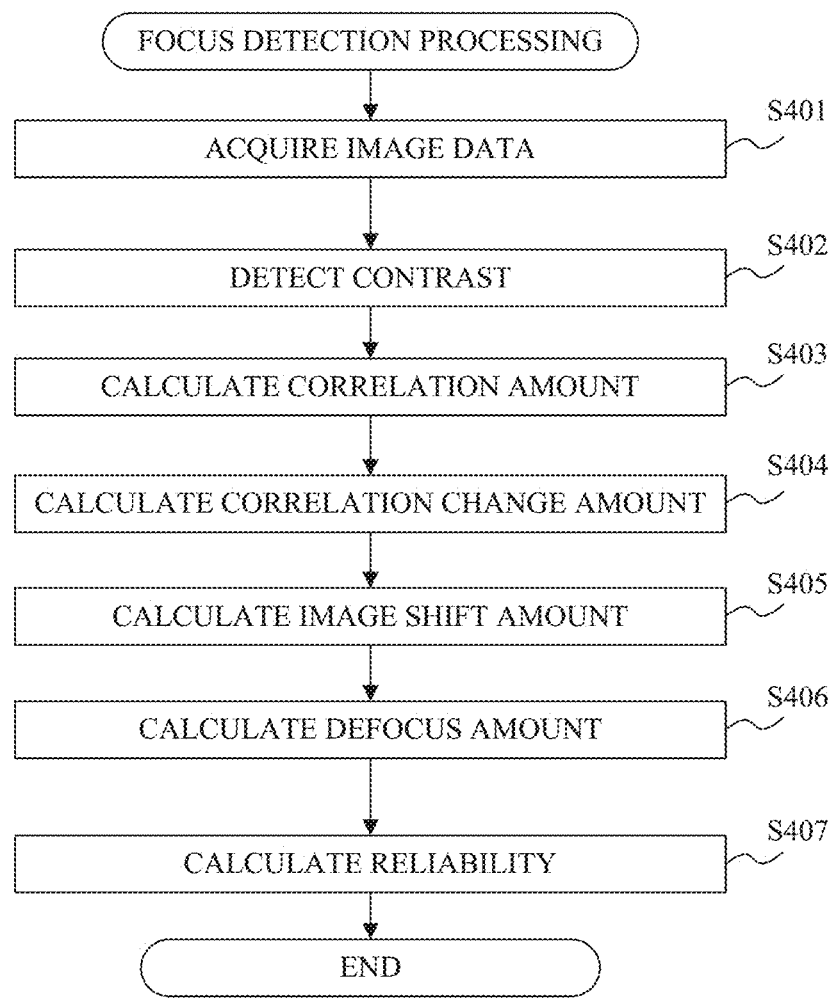
FIG. 4 is a flowchart illustrating focus detection processing according to the first embodiment.

A flowchart in FIG. 4 illustrates focus detection processing to be executed by the AF signal processing unit 204 in S302 of FIG. 3. The AF signal processing unit 204 is also a computer, and executes this processing according to a computer program.

In S401, the AF signal processing unit 204 acquires AF signals from a plurality of pixels included in pixel areas corresponding to each of a plurality of AF frames in the image sensor 201.

Next, in S402, the AF signal processing unit 204 detects contrast using peak and bottom information on the AF signals acquired in S401. Here, in a case where the detected contrast is equal to or higher than a predetermined value, the object or the like in each AF frame is treated as high contrast, and in a case where it is lower than the predetermined value, it is treated as low contrast.

Next, in S403, the AF signal processing unit 204 relatively shifts the pair of phase-difference image signals as the AF signals for each AF frame by one pixel (1 bit), and calculates a correlation amount between the pair of phase-difference image signals.

Next, in S404, the AF signal processing unit 204 calculates a correlation change amount for each AF frame from the correlation amount calculated in S403.

Next, in S405, the AF signal processing unit 204 calculates an image shift amount for each AF frame using the correlation change amount calculated in S404.

In S406, the AF signal processing unit 204 calculates a detected defocus amount for each AF frame using the image shift amount for each AF frame calculated in S405.

In S407, the AF signal processing unit 204 calculates the reliability of the detected defocus amount (in other words, a pair of phase-difference image signals) calculated in S406, and ends this flow. The reliability can be classified into "focus OK" in which both the defocus amount and direction are reliable (sufficient to obtain an in-focus state), "defocus OK" in which only the defocus amount is reliable, and "direction OK" in which only the defocus direction is reliable, and "NG" in which both are unreliable.

Referring now to FIG. 5, a description will be given of the focus tracking determination performed by the AF control unit 2121. An upper diagram of FIG. 5 illustrates a state in which object A approaching the camera system is captured by the main AF frame at certain time t. A lower diagram of FIG. 5 illustrates a predicted image plane position of object A and the time-series changes in far-side and near-side thresholds (image plane positions) for focus tracking determination based on the predicted image plane position of object A. The focus tracking range is a range from the near-side threshold to the far-side threshold.

FIG. 5 illustrates an example in which a difference between the far-side threshold and the predicted image plane position and a difference between the near-side threshold and the predicted image plane position are equal and do not change with time. The difference between the far-side threshold and the predicted image plane position and the difference between the near-side threshold and the predicted image plane position may be changed depending on various conditions such as time intervals between focus detections and a moving speed of the object.

In a case where the image plane position calculated from the detected defocus amount obtained within the main AF frame is equal to or lower than the far-side threshold and equal to or higher than the near-side threshold, the AF control unit 2121 determines that focus tracking is to be performed. In this case, the detected defocus amount that has been used for this determination is used to perform the prediction calculation processing in S307 of FIG. 3, and the focus lens 103 is driven in S310 based on this detected defocus amount. On the other hand, in a case where the image plane position calculated from the detected defocus amount obtained within the main AF frame is on the far side of the far-side threshold or on the near side of the near-side threshold, the AF control unit 2121 determines that focus tracking is not to be performed. In this case, the prediction calculation processing in S307 of FIG. 3 is performed without using the detected defocus amount that has been used for this determination, and the focus lens 103 is not driven in S310 based on this detected defocus amount. Thus, the processing is switched according to the determination result as to whether or not focus tracking is to be performed.

Figure 6A:
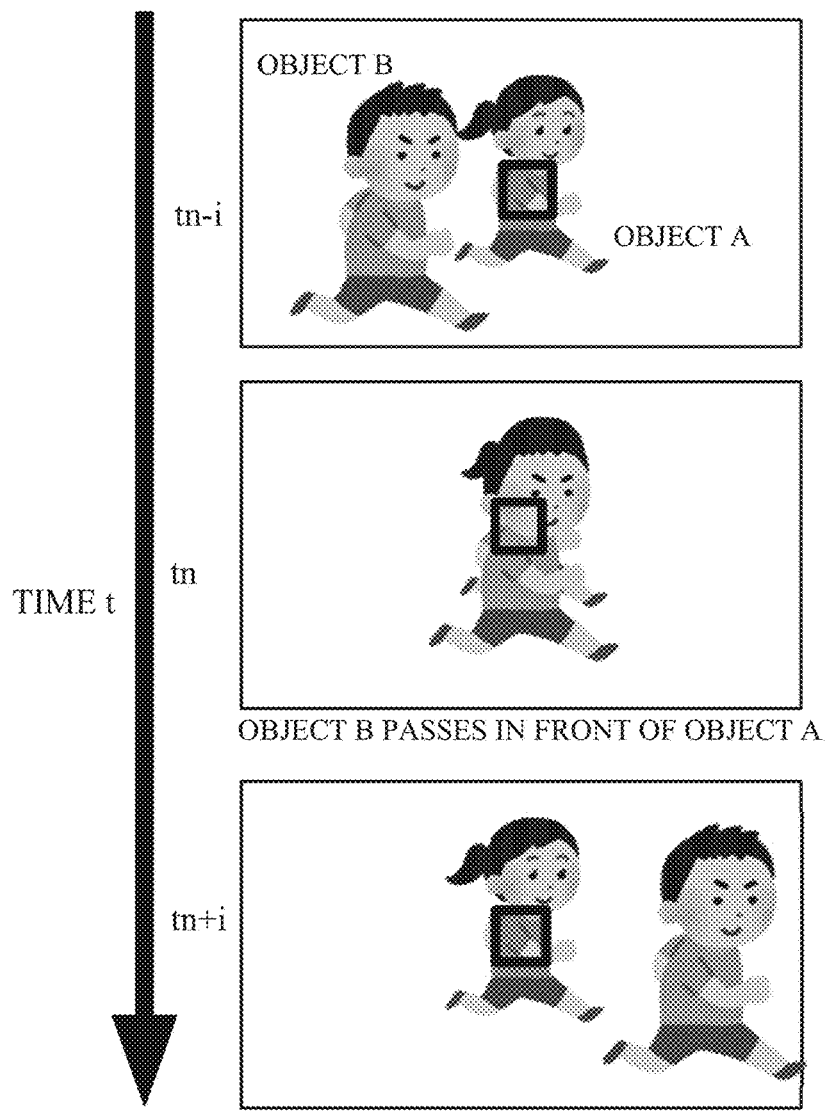
FIGS. 6A, 6B, 6C, and 6D illustrate changes in framing for an object in the first embodiment.
Figure 6B:
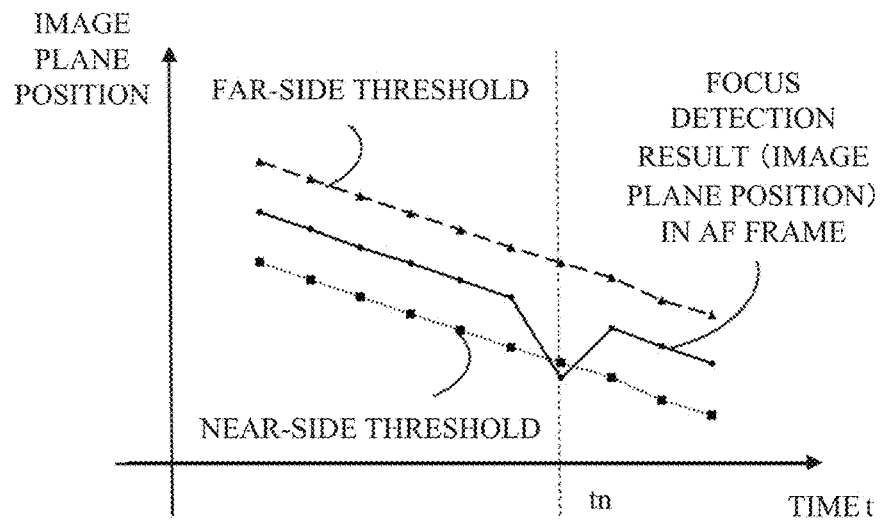
Figure 6C:
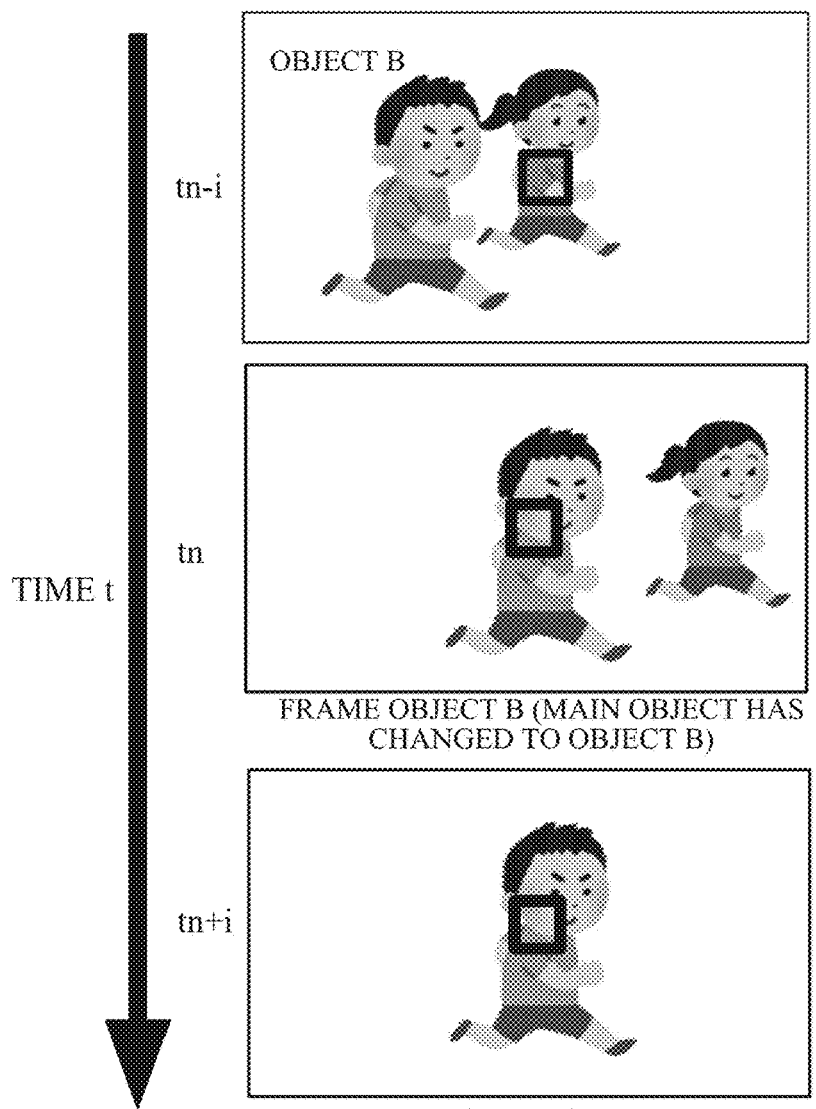

Referring to FIGS. 6A, 6B, 6C, and 6D, a description will be given of an issue of the focus tracking determination. FIGS. 6A and 6C illustrate that object A in FIG. 5, and object B closer to the camera system than object A. In FIG. 6A, object B passes in front of object A from time tn−i to time tn+i. At this time, object B completely hides object A at time tn. At later time tn+i, object B overtakes object A, and object A appears again.

FIG. 6B illustrates changes in an image plane position (referred to as a detected image plane position hereinafter) calculated from the detected defocus position within the main AF frame from time tn−i to time tn+i in the case of FIG. 6A. At time tn−i, object A continues to be captured by the main AF frame, so the detected image plane position in the main AF frame is also calculated to coincide the predicted image plane position of object A (FIG. 5), and it is located within the focus tracking range.

At the next time tn, a detected image plane position nearer than the predicted image plane position is calculated as illustrated in FIG. 6B so that the main AF frame captures object B closer than object A. At this time, since the detected image plane position is located on the near side (out of the focus tracking range) of the near-side threshold, the AF control unit 2121 determines that focus tracking is not to be performed anymore with the main AF frame. By not driving the lens 103, object B is also not focused.

At subsequent time tn+i, in a case where object B overtakes object A, the detected image plane position with the main AF frame is again detected along the predicted image plane position, and focus tracking on object A resumes. The above is the basic focus tracking determination.

Figure 6D:
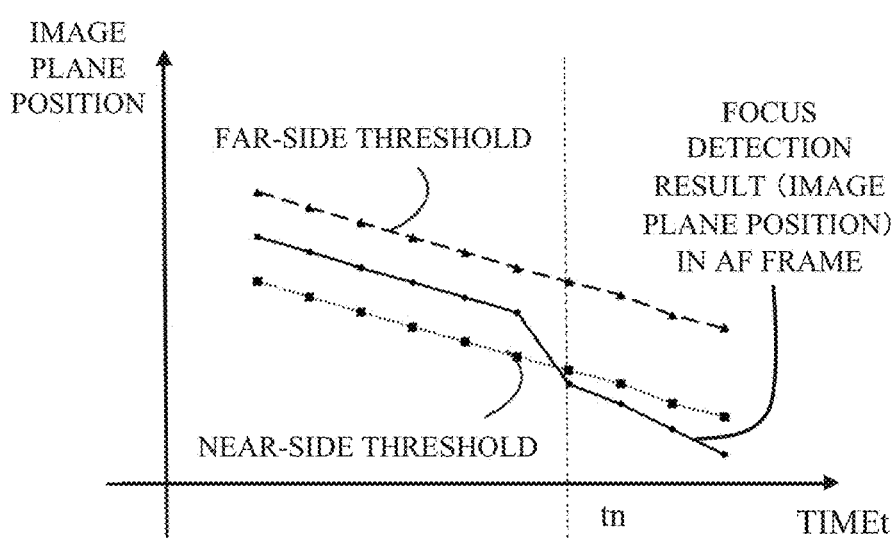

FIG. 6C is similar to FIG. 6A in that object B exists at a position closer to the camera system than object A, but is different from FIG. 6A in that the user intentionally switches the main object from object A to object B at time tn. FIG. 6D illustrates changes in a detection image plane position in the main AF frame in this case.

In FIG. 6D, until time tn−i, the detected image plane position changes in the same way as in FIG. 6B. However, after time tn in a case where the main object is switched, the detected image plane position of object B is acquired, and the detected image plane position is on the near side of the near-side threshold, so that the AF control unit 2121 determines that focus tracking is not to be performed with the main AF frame anymore. As a result, although the user intends to switch the main object to object B, object B remains out of focus. In a case where the detected image plane position obtained at time tn is within the focus tracking range in the case illustrated in FIG. 6A, the main object remains object A but the object to be focused is switched to object B. Thus, correct focus tracking determination may become difficult only by determining whether or not the detected image plane position is within the focus tracking range. For such a case, this embodiment uses shield information acquired by the object recognition unit 2125.

Figure 7B:
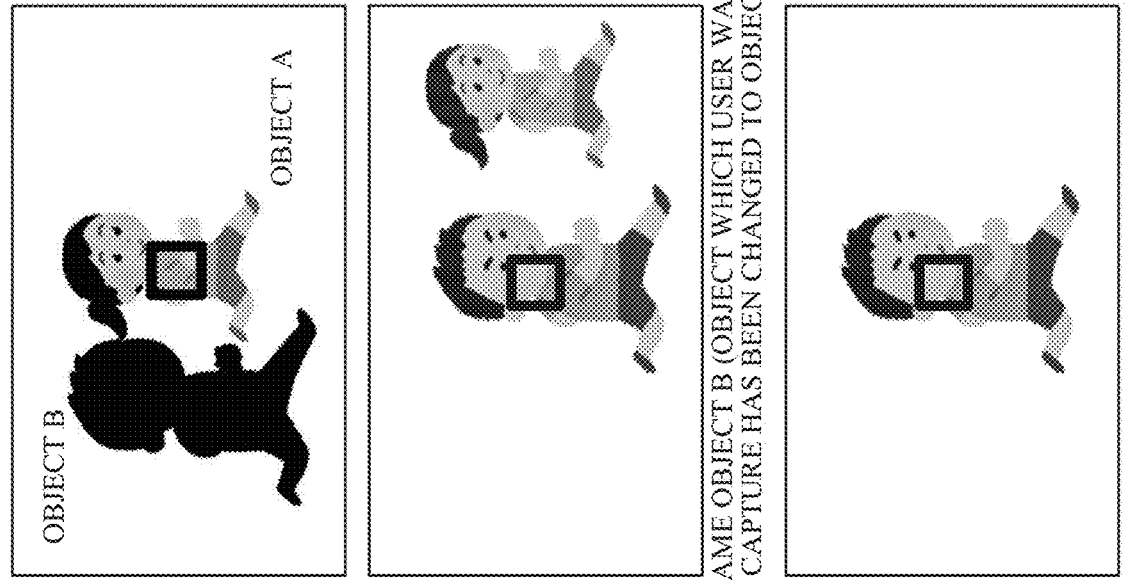
FIGS. 7A and 7B illustrate shield information in FIGS. 6A to 6D.
Figure 7A:
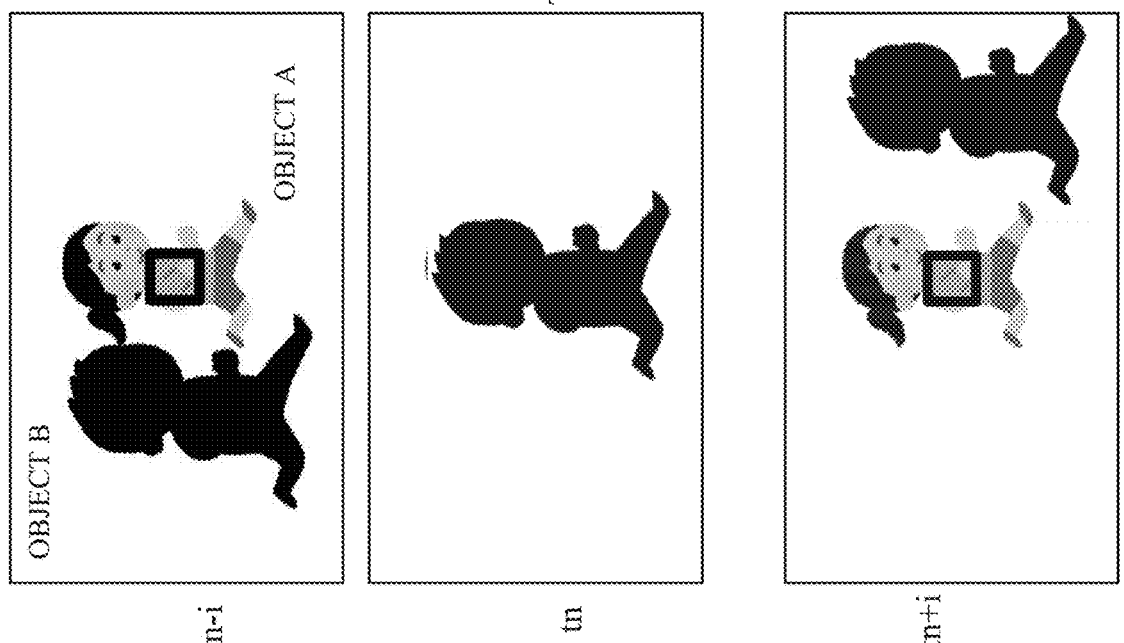

FIGS. 7A and 7B illustrate shield information acquired in the cases of FIGS. 6A and 6B, respectively. A black area is a shield area, and other areas are not shield areas. In FIG. 7A, object B is detected as a shield area from time tn−i to time tn+i. In FIG. 7B, object B is detected as a shield area at time tn−i. At time tn, the main object switches from object A to object B due to a change in framing by the user, and object B is not detected as a shield area after time tn.

Figure 8:
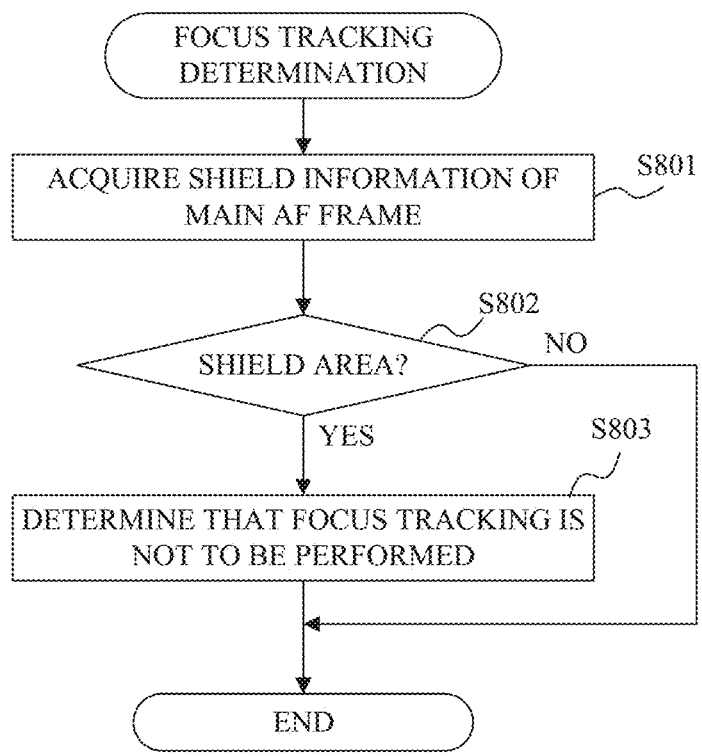
FIG. 8 is a flowchart illustrating focus tracking determination using only shield information.

A flowchart in FIG. 8 illustrates focus tracking determination processing using only shield information as a comparative example of this embodiment. In S801, the AF control unit 2121 acquires shield information for the main AF frame selected in S303 from the object recognition unit 2125.

Next, in S802, the AF control unit 2121 determines whether or not the area captured by the main AF frame is a shield area, based on the shield information acquired in S801. At times tn−i and tn+i in FIG. 7A and times tn−i, tn, and tn+i in FIG. 7B, the AF control unit 2121 determines that the area captured by the main AF frame is not a shield area, and terminates this flow. On the other hand, at time tn in FIG. 7A, the AF control unit 2121 determines that the area captured by the main AF frame is a shield area, and determines in S803 that focus tracking is not to be performed.

However, the shield area basically exists only at a position closer to the camera system than the main object. Therefore, focus tracking determination using only shield information determines that focus tracking is to be performed in all cases where a detected image plane position falls outside the focus tracking range beyond the far-side threshold. Accordingly, this embodiment performs, in S304 of FIG. 3, focus tracking determination processing illustrated in a flowchart of FIG. 9.

In S901, the AF control unit 2121 acquires a predicted image plane position from the prediction unit 2124.

Next, in S902, the AF control unit 2121 acquires far-side and near-side thresholds of the focus tracking range.

Next, in S903, the AF control unit 2121 acquires a detected defocus amount in the main AF frame selected in S303.

Next, in S904, the AF control unit 2121 calculates a detected image plane position from the detected defocus amount acquired in S903.

Next, in S905, the AF control unit 2121 determines whether the detected image plane position calculated in S904 is on the near side of the predicted image plane position acquired in S901 (the detected image plane position indicates an image plane position on the near side of the main object). In a case where it is on the near side, the flow proceeds to S906, and in a case where it is on the far side, the flow proceeds to S909.

In S906, the AF control unit 2121 acquires shield information for the main AF frame from the object recognition unit 2125.

In S907, the AF control unit 2121 determines from the shield information acquired in S906 whether or not the area captured by the main AF frame is a shield area (whether the main AF frame captures a shield). At this time, object B is detected as a shield area at time tn in FIG. 7A, so the area captured by the main AF frame is determined to be a shield area. On the other hand, at time tn in FIG. 7B, object B is not detected as a shield area, so the area captured by the main AF frame is not determined to be a shield area. In a case where the area captured by the main AF frame is a shield area, the flow proceeds to S908 to determine that focus tracking is not to be performed and ends. Then, the flow proceeds to S305 in FIG. 3. On the other hand, in a case where it is not a shield area (shield information is not acquired), it is determined that focus tracking is to be performed, and this flow ends and proceeds to S305.

In S909, the AF control unit 2121 determines whether the detected image plane position calculated in S904 is on the far side of the far-side threshold obtained in S902. In a case where it is determined that the object is on the far side of the far-side threshold (outside the focus tracking range), the flow proceeds to S908 to determine that focus tracking is not to be performed, ends, and proceeds to S305 in FIG. 3. On the other hand, in a case where it is within the focus tracking range, it is determined that focus tracking is to be performed, and this flow ends and proceeds to S305.

This embodiment can perform proper focus tracking determination even in a case where there is a shield area or the main object is switched.

In this embodiment, the focus determination processing and the moving object determination processing use an image plane position, but the processing may use a defocus amount. Since the image plane position corresponds to the defocus amount, it is information about the defocus amount. That is, the focus determination processing and moving object determination processing may use information about the defocus amount.

Second Embodiment

A description will now be given of a second embodiment. The second embodiment performs focus tracking determination according to object information indicating whether a detected object is a specific object.

Figure 10:
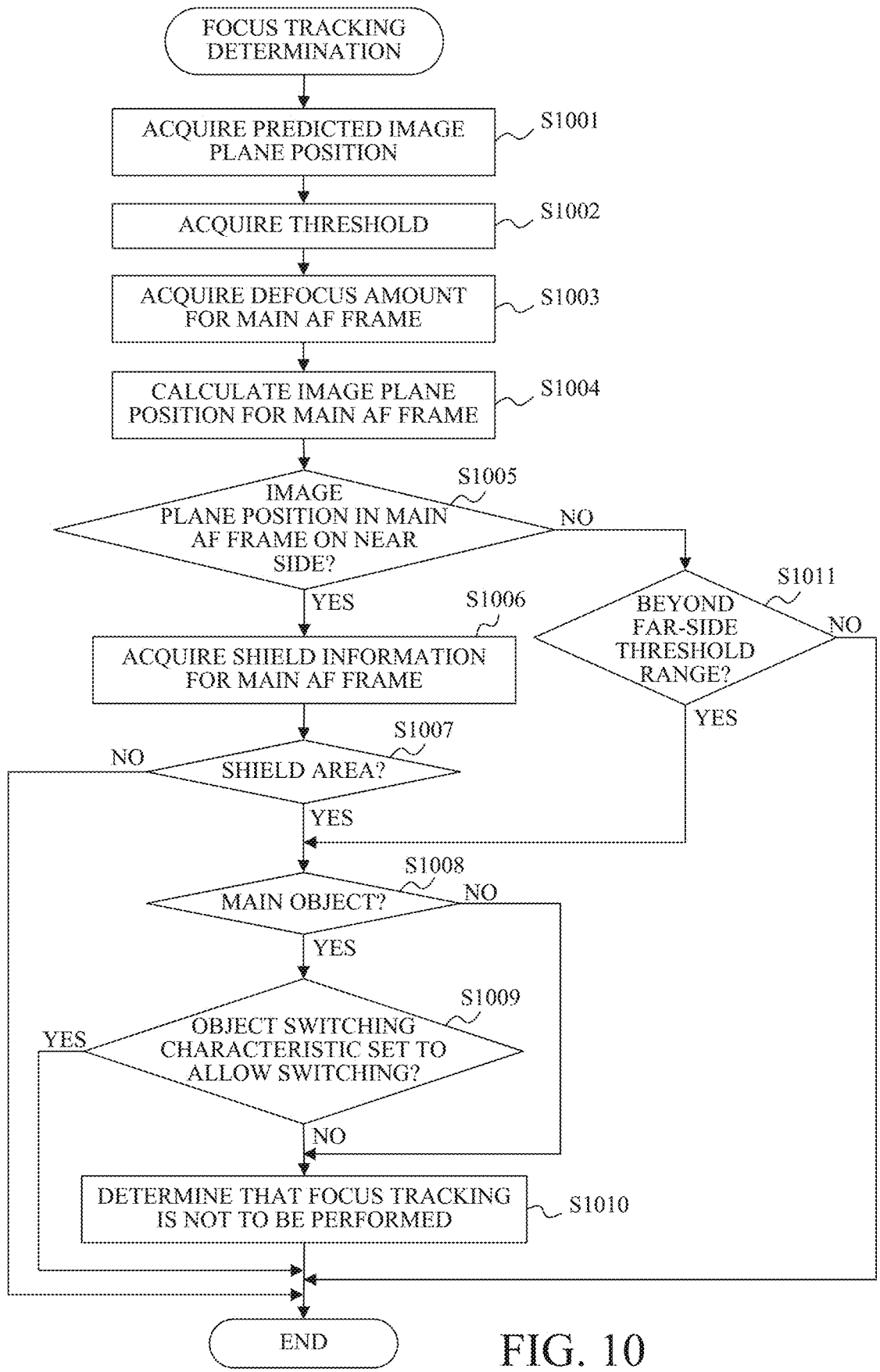
FIG. 10 is a flowchart illustrating focus tracking determination according to a second embodiment.
Figure 11A:
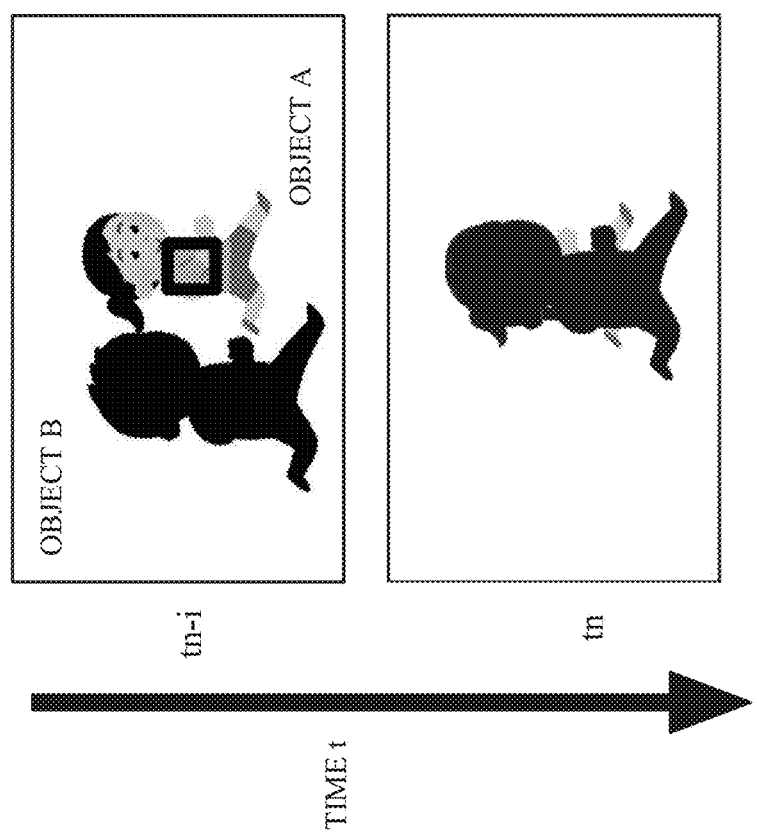
FIGS. 11A and 11B illustrate shield information in a case where a shield area is a detected object and the shield area is not the detected object in the second embodiment.
Figure 11B:
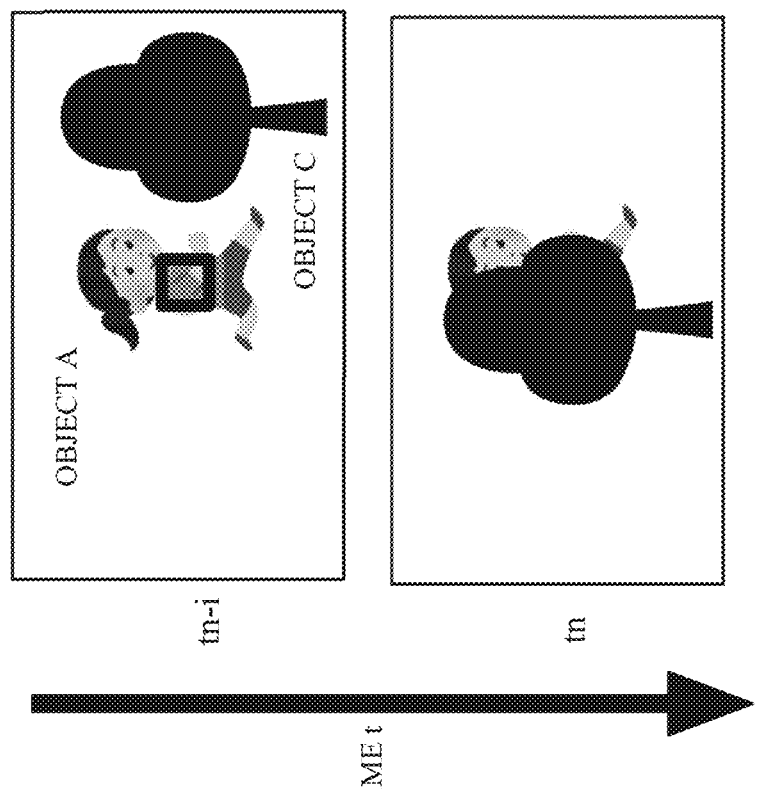

FIG. 11A illustrates a case where a shield area for object A, which was the main object at time tn−i, is detected as object B as a specific object (person) at time tn. FIG. 11B illustrates a case where a shield area for object A is object (tree) C, which is not a specific object, at time tn. The detected image plane positions corresponding to objects B and C are both located on the near side of the near-side threshold of the focus tracking range, and are objects for which it is determined that focus tracking is not to be performed. However, in the processing illustrated in FIG. 10, which will be described below, FIG. 11A illustrates an example in which it is determined that focus tracking is to be performed because object B is a shield area but is a specific object, and FIG. 11B illustrates an example in which it is determined that focus tracking is not to be performed because the object is not a specific object.

Figure 12:
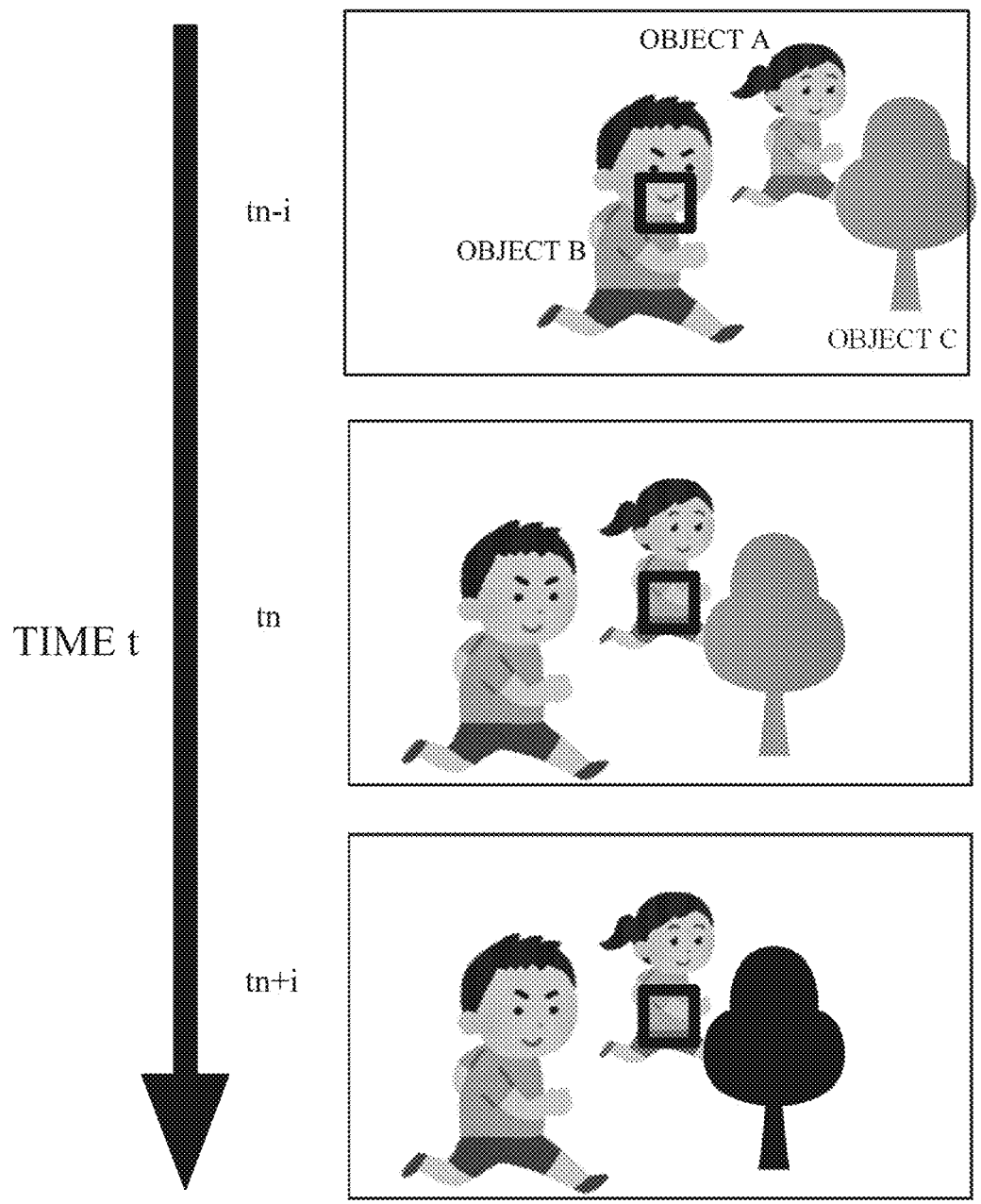
FIG. 12 illustrates time-series changes and shield information on objects A, B, and C in the second embodiment.

In FIG. 12, objects A, C, and B exist in order from the farthest to the shortest distance from the camera system, object B is a main object at time tn−i, and the user changes framing so as to switch the main object to object A at time tn.

Figure 9:
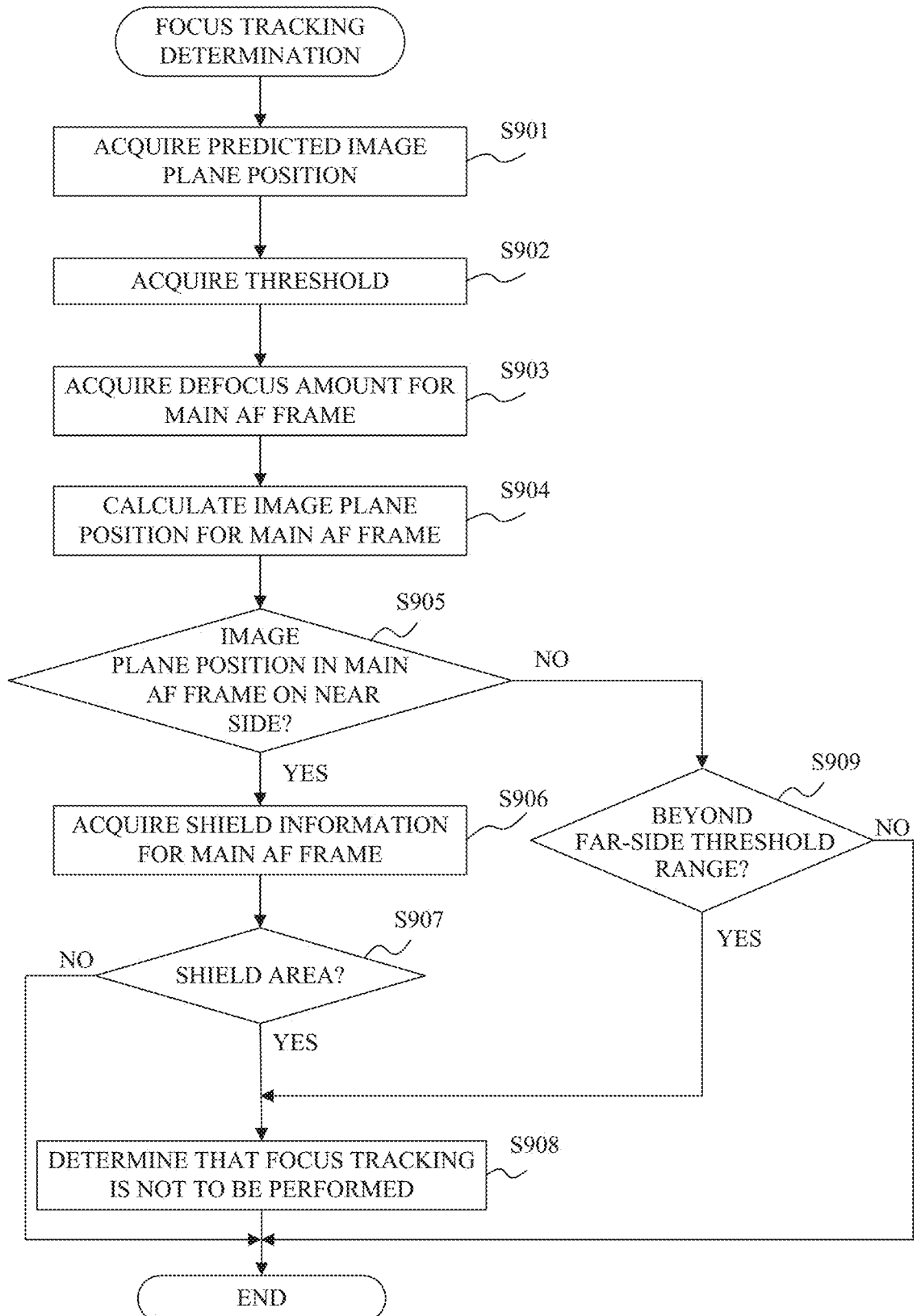
FIG. 9 is a flowchart illustrating focus tracking determination according to the first embodiment.

The flowchart in FIG. 10 illustrates focus tracking determination processing in this embodiment. Since S1001 to S1007 are the same as S901 to S907 in FIG. 9, a description thereof will be omitted.

The AF control unit 2121 that has determined in S1007 that the area captured by the main AF frame is a shield area determines in S1008 whether or not a specific object is detected in the shield area. In the case of FIG. 11A, object B, which is the specific object, is detected in the shield area, so the flow proceeds to S1009. On the other hand, in the case of FIG. 11B, since the specific object is not detected in the shield area, the flow proceeds to S1010 and the AF control unit 2121 determines that focus tracking is not to be performed, ends this flow and proceeds to S305 in FIG. 3.

Step S1009 is provided in a case where the object recognition unit 2125 detects a plurality of objects and the user is allowed to set as an object switching characteristic through the camera operation unit 213, a function as to whether a main object is to be actively switched to a newly detected specific object or is not to be switched at all. In a case where the setting is made to allow object switching, the AF control unit 2121 ends this processing without determining that focus tracking is not to be performed (by determining that focus tracking is to be performed), and the flow proceeds to S305 in FIG. 3.

On the other hand, in a case where there is a setting that does not allow object switching, the flow proceeds to S1010 and the AF control unit 2121 determines that focus tracking is not to be performed. In the case where S1009 is not provided in a camera system in which the object switching characteristic cannot be set, the AF control unit 2121 determines that focus tracking is to be performed as long as a specific object is detected in a shield area in S1008, and ends this processing and proceeds to S305 in FIG. 3.

In S1011, the AF control unit 2121 determines whether or not the detected image plane position calculated in S1004 is on the far side of the far-side threshold obtained in S1002, as in S909 of FIG. 9. In a case where it is determined that the object is on the far side of the far-side threshold (outside the focus tracking range), the flow proceeds to step S1008; otherwise (if it is within the focus tracking range), the flow ends by determining that the focus tracking is to be performed and proceeds to S305 in FIG. 3.

At time tn illustrated in FIG. 12, the detected image plane position within the main AF frame is located on the far side, so in S1011 the AF control unit 2121 determines whether or not the detected image plane position is on the far side of the focus tracking range, and in a case where it is on the far side of the focus tracking range, the flow proceeds to S1008. Since object A at time tn is a specific object, the flow proceeds to S1009 and the AF control unit 2121 determines whether or not the focus tracking is to be performed according to the setting of object switching characteristic. In FIG. 12, in a case where the setting is made to allow object switching, it is not determined that focus tracking is not to be performed at time tn, and focus tracking on distant object A is performed. Since the main object is switched from object B to object A by performing this focus tracking, object C is determined to be a shield area for object A at time tn+i.

This is the description of the focus tracking determination using the shield information and the object information according to this embodiment. This embodiment can perform proper focus tracking determination depending on whether or not a shield area is a specific object.

By the way, since shield information is generated for the main object, object A as the main object is completely hidden behind the shield area and is not detected at time tn in FIG. 11A. As a result, the shield information indicating the shield area may not be output from the object recognition unit 2125. A description will now be given of a method for generating shield information indicating a shield area even in a situation where shield information indicating a shield area is not output from the object recognition unit 2125.

The first method stores an image plane position for a shield area in the just previous frame for a frame for which the shield information indicating the shield area is no longer output among the plurality of frames in the image (video), and sets as a shield area an area in which an image plane position whose difference from the stored image plane position is equal to or smaller than a predetermined value is detected.

Figure 13:
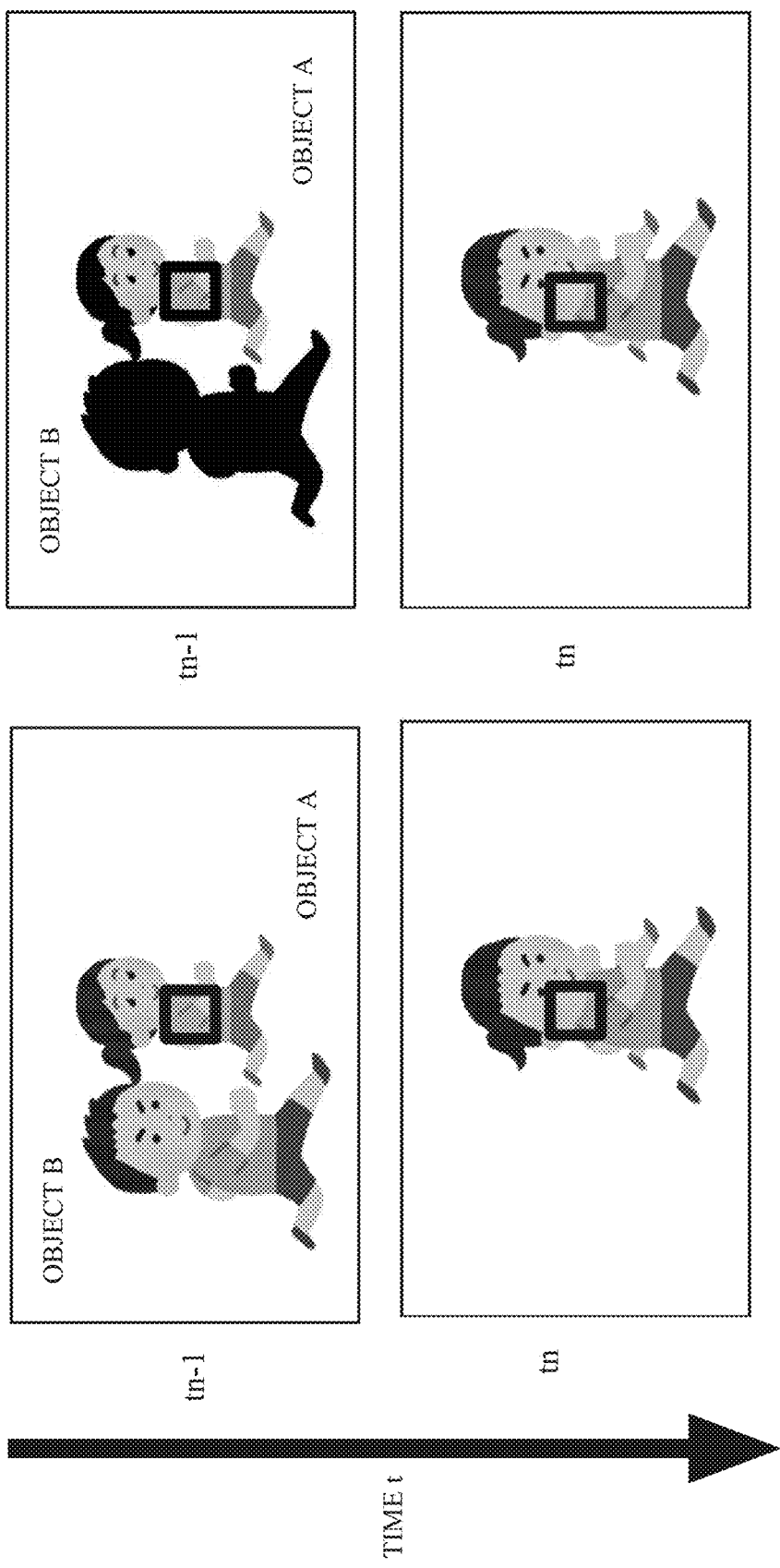
FIGS. 13A and 13B illustrate shield information in a case where object A is no longer detected at time tn in the second embodiment.
Figure 14:
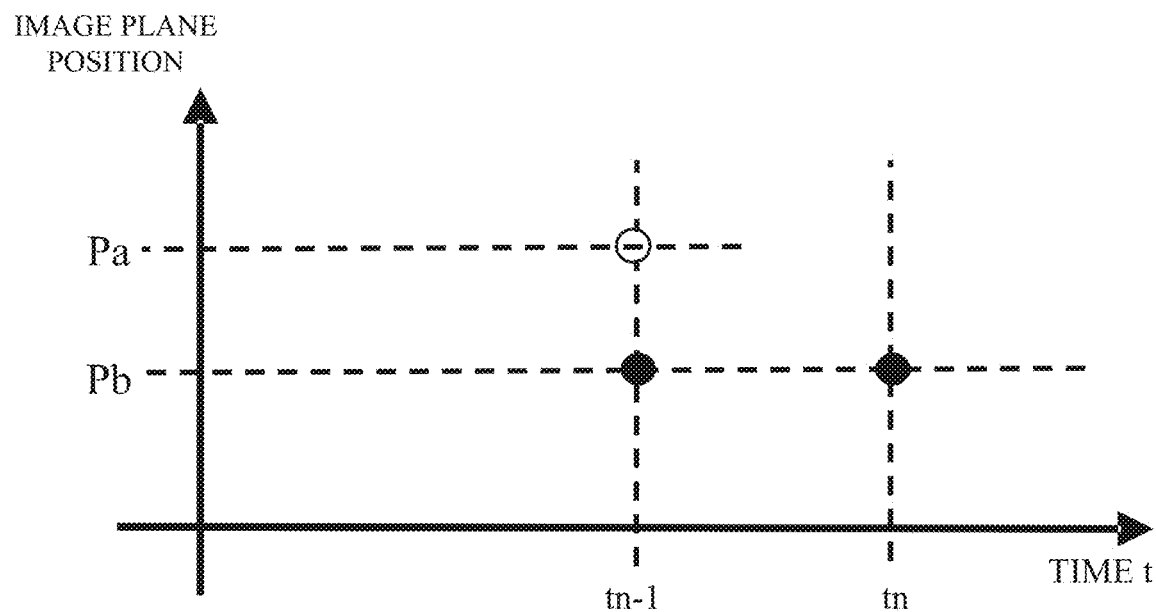
FIG. 14 illustrates the image plane position in FIGS. 13A and 13B.

FIG. 13A illustrates frames at times tn−1 and tn, and FIG. 13B illustrates a shield area at time tn−1. FIG. 14 illustrates image plane positions at times tn−1 and tn.

In the frame at time tn−1, object A is detected in the main AF frame, and object B in front of object A can be detected as a shield area. Therefore, as illustrated in FIG. 14, an image plane position Pa for object A and an image plane position Pb for the shield area (object B) are detected.

At time tn, object A is hidden by the shield area (object A no longer exists), and thus object B can no longer be detected as a shield area. At this time, the image plane position Pb for the shield area (object B) at time tn−1 illustrated in FIG. 14 is stored. At time tn, an image plane position where a difference from the stored image plane position Pb is equal to or less than a predetermined value is searched for, and an area where the corresponding image plane position is detected is set as a shield area.

Figure 15:
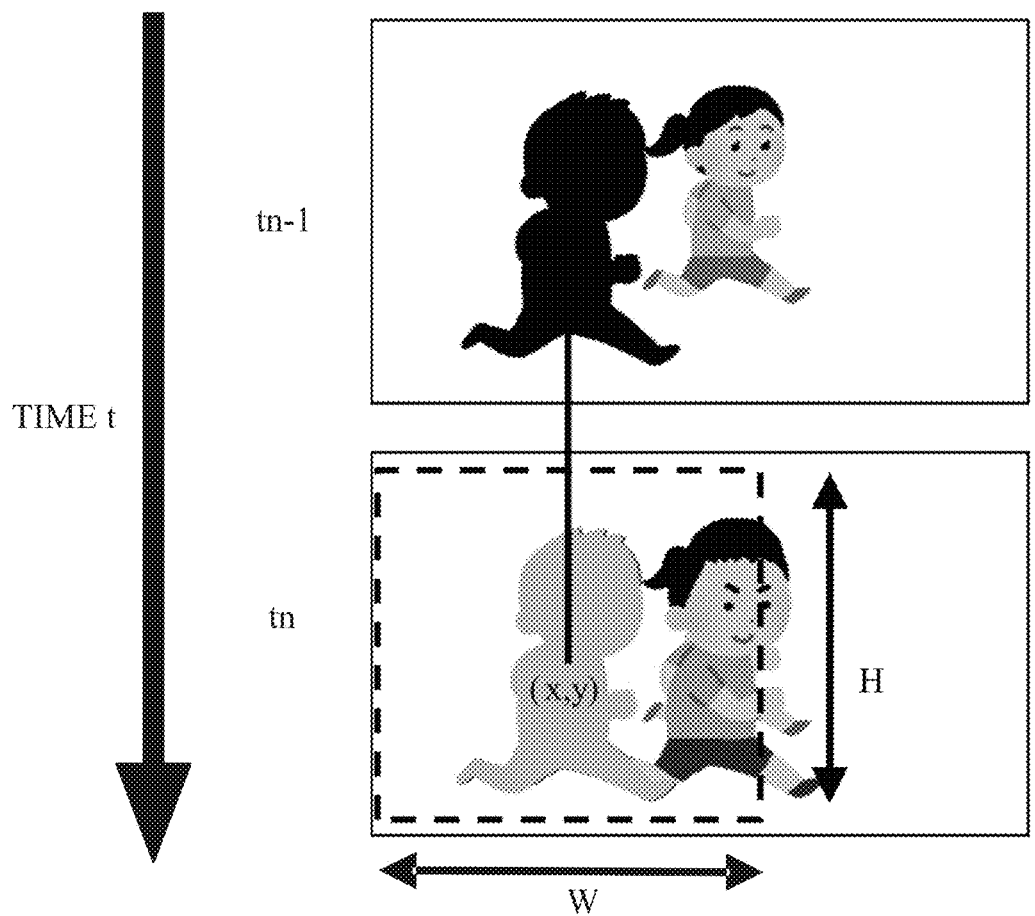
FIG. 15 explains a range for searching a defocus amount of the shield area in the second embodiment.

A range of the image plane position in which a difference from the stored image plane position Pb is equal to or less than the predetermined value can be changed according to the aperture value (F-number) of the imaging optical system, the gain of the image sensor 201 during AF, and the like. The area for searching for the image plane position where the difference from the stored image plane position is equal to or less than the predetermined value may be the entire image data of the corresponding frame, or a predetermined range (range of width W and height H) centered on the existing coordinates (x, y) at which the shield area existed in the previous frame (at time n) as illustrated in FIG. 15. However, in this case, the shield area is a non-moving object.

Figure 16:
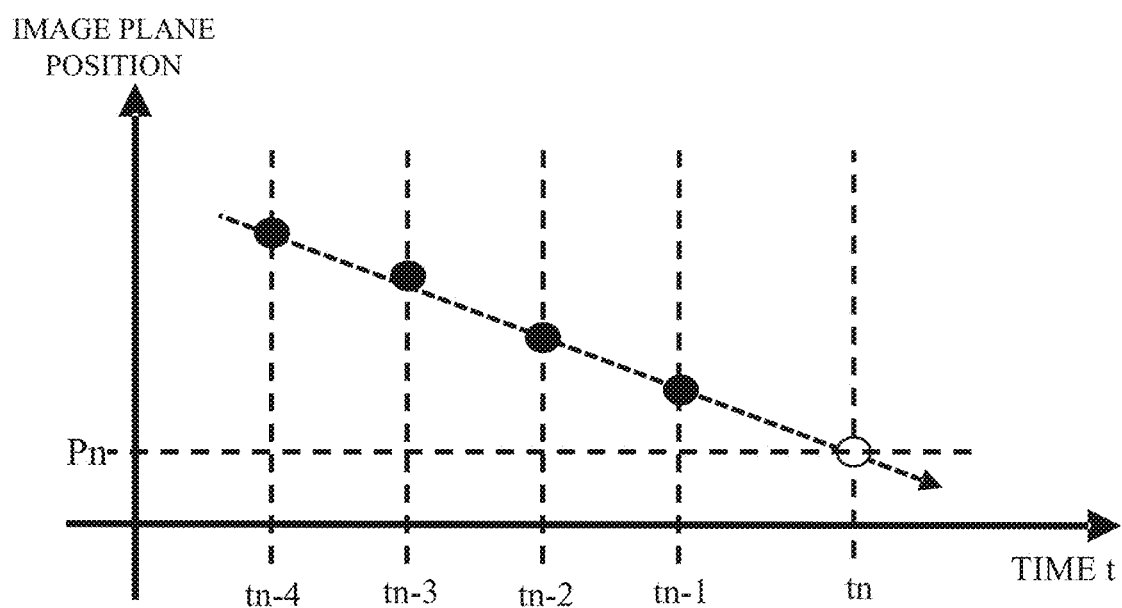
FIG. 16 explains prediction of an image plane position Pn of a shield area at time tn in the second embodiment.

The second method predicts the image plane position Pn of the shield area at time to from changes in the image plane position of the shield area at a plurality of times tn−1 to tn−4 in the past, as illustrated in FIG. 16, and sets as a shield area an area in which an image plane position whose difference from the predicted image plane position Pn is equal to or less than the predetermined value is detected. The expected image plane position may be predicted using a quadratic curve as a prediction function as performed by the prediction unit 2124, or using a linear curve obtained from the latest two points as a prediction function. A prediction equation f(t) such as that illustrated in equation (1) may be obtained by statistical calculation using the least-squares method, and the predicted image plane position may be predicted using this prediction equation.

Thus, proper shield information can be obtained even in an imaging scene in which a main object is completely hidden by a shield area.

This embodiment can make proper focus tracking determination.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-147457, filed on Sep. 15, 2022, which is hereby incorporated by reference herein in its entirety.

What is claimed is:

1. An apparatus configured to perform focus tracking on an object within a detection area to detect a defocus amount within an imaging angle of view, the apparatus comprising:
a memory storing instructions; and
a processor configured to execute the instructions to:
perform focus tracking determination to determine whether or not the focus tracking is to be performed using information about the defocus amount, and
acquire information about a shield against the object from image data generated by imaging,
wherein the processor is configured to perform the focus tracking determination using information about the shield acquired in the detection area.

2. The apparatus according to claim 1, wherein the processor is configured to determine that:
the focus tracking is to be performed in a case where the information about the shield is not acquired in the detection area, and
the focus tracking is not to be performed in a case where the information about the shield is acquired in the detection area.

3. The apparatus according to claim 1, wherein the processor is configured to determine that:
the focus tracking on a specific object is to be performed in a case where the information about the shield acquired in the detection area indicates that the shield is the specific object, and
the focus tracking on the specific object is not to be performed in a case where the information about the shield acquired in the detection area indicates that the shield is not the specific object.

4. The apparatus according to claim 3, wherein the processor is configured to determine that the focus tracking on the specific object is to be performed in a case where the information about the shield acquired in the detection area indicates that the shield is the specific object and switching of the object for the focus tracking is permitted.

5. The apparatus according to claim 1, wherein the processor is configured to acquire the information about the shield in a case where the information about the defocus amount acquired in the detection area indicates a side closer than the object.

6. The apparatus according to claim 1, wherein the processor is configured to perform:
the focus tracking in a case where the information about the defocus amount is within a predetermined range, and
the focus tracking determination without using the information about the shield in a case where the information about the defocus amount acquired in the detection area indicates a far side beyond the predetermined range.

7. The apparatus according to claim 1, wherein the processor is configured to:
acquire the information about the shield for each frame of the image data,
store the information about the defocus amount in a frame where the information about the shield was acquired, and
acquire the information about the shield using stored information about the defocus amount in a frame where the information about the shield was not acquired.

8. The apparatus according to claim 7, wherein the processor is configured to acquire the information about the shield based on information about a defocus amount at which a difference from the information about the stored defocus amount or a difference from information about a defocus amount predicted using the information about the stored defocus amount is equal to or smaller than a predetermined value in the frame in which the information about the shield was not acquired.

9. The apparatus according to claim 1, wherein the processor is configured to acquire information about the shield using a convolutional neural network.

10. The apparatus according to claim 1, wherein the processor is configured to:
determine whether the object within the detection area is a moving object or a non-moving object and perform focus control,
perform the focus control based on a defocus amount detected for the non-moving object in a case where it is determined that the focus tracking is to be performed and it is determined that the object within the detection area is the non-moving object, and perform the focus control based on a defocus amount predicted using a defocus amount detected for the moving object in a case where it is determined that the focus tracking is to be performed and it is determined that the moving object is the moving object, and
not perform the focus control in a case where it is determined that the focus tracking is not to be performed and it is determined that the object in the detection area is the non-moving object, and perform the focus control using a predicted defocus amount without using the defocus amount in a case where it is determined that the focus tracking is not to be performed and it is determined that the object in the detection area is the moving object.

11. An optical apparatus comprising the apparatus according to claim 1.

12. An image pickup apparatus comprising:
the apparatus according to claim 1; and
an image sensor configured to image the object within an imaging angle of view.

13. A method configured to perform focus tracking on an object within a detection area to detect a defocus amount within an imaging angle of view, the method comprising:
performing focus tracking determination to determine whether or not the focus tracking is to be performed using information about the defocus amount; and
acquiring information about a shield against the object from image data generated by imaging,
wherein performing the focus tracking determination uses information about the shield acquired in the detection area.

14. The method according to claim 13, further comprising acquiring the information about the shield in a case where the information about the defocus amount acquired in the detection area indicates a side closer than the object.

15. The method according to claim 13, further comprising:
    performing focus tracking in a case where the information about the defocus amount is within a predetermined range; and
    performing focus tracking determination without using the information about the shield in a case where the information about the defocus amount acquired in the detection area indicates a far side beyond the predetermined range.

16. The method according to claim 13, further comprising:
    acquiring the information about the shield for each frame of the image data;
    storing the information about the defocus amount in a frame where the information about the shield was acquired; and
    acquiring the information about the shield using stored information about the defocus amount in a frame where the information about the shield was not acquired.

17. A non-transitory computer-readable storage medium storing a program that causes a computer to execute a method configured to perform focus tracking on an object within a detection area to detect a defocus amount within an imaging angle of view, the method comprising:
    performing focus tracking determination to determine whether or not the focus tracking is to be performed using information about the defocus amount; and
    acquiring information about a shield against the object from image data generated by imaging,
    wherein performing the focus tracking determination uses information about the shield acquired in the detection area.

18. The non-transitory computer-readable storage medium according to claim 17, further comprising acquiring the information about the shield in a case where the information about the defocus amount acquired in the detection area indicates a side closer than the object.

19. The non-transitory computer-readable storage medium method according to claim 17, further comprising:
    performing focus tracking in a case where the information about the defocus amount is within a predetermined range; and
    performing focus tracking determination without using the information about the shield in a case where the information about the defocus amount acquired in the detection area indicates a far side beyond the predetermined range.

20. The non-transitory computer-readable storage medium according to claim 17, further comprising:
    acquiring the information about the shield for each frame of the image data;
    storing the information about the defocus amount in a frame where the information about the shield was acquired; and
    acquiring the information about the shield using stored information about the defocus amount in a frame where the information about the shield was not acquired.

* * * * *